United States Patent
Thiel

[15] 3,660,198
[45] May 2, 1972

[54] METHOD OF MAKING DOUBLE WALLED PLASTIC ARTICLES

[72] Inventor: Alfons W. Thiel, Uferstrasse 15, Mainz/Rhine, Germany

[22] Filed: Aug. 29, 1969

[21] Appl. No.: 854,129

[30] Foreign Application Priority Data

Sept. 17, 1968 Germany ..................P 17 79 723.8
Sept. 26, 1968 Germany ..................P 17 79 790.9

[52] U.S. Cl. ..........................156/292, 156/242, 220/15, 156/306
[51] Int. Cl. ...................................................B32b 31/04
[58] Field of Search ..................156/290, 292, 243, 242; 220/15; 229/3.5

[56] References Cited

UNITED STATES PATENTS

| | | | |
|---|---|---|---|
| 2,257,823 | 10/1941 | Stokes | 156/292 |
| 2,575,764 | 10/1951 | Morner | 156/292 |
| 3,070,481 | 12/1962 | Schornstheimer | 156/292 |
| 3,114,172 | 12/1963 | Coste | 156/292 |
| 3,100,172 | 8/1963 | Nier | 156/292 |

*Primary Examiner*—Reuben Epstein
*Attorney*—Strauch, Nolan, Neale, Nies & Kurz

[57] ABSTRACT

Double walled plastic articles chiefly receptacles comprise jacket and lining members of relatively thin thermoplastic sheet material such as foils connected firmly around outer peripheral portions and relatively shaped to provide on the article an outer annular peripheral wall section containing an insulating air space region between the members. The jacket and lining are formed with ribs and/or the like which cross and are firmly surface bonded to each other under heat and pressure within air space region at a plurality of spaced substantially flat areas. The jacket and lining may be stepped. Special methods and apparatus are provided for producing the articles including connecting and shaping tools for forming bonded double layer regions surrounding air cushion areas that function in the process to insure proper forming of the jacket and lining as the tool dies come together. The die faces also include projections for imparting an added mechanical interlock at the bonded areas. The articles may be continuously produced starting with two separate heated foil webs, which may be differently responsive to heat or otherwise different, or starting with continuously extruded thermoplastic tubing. In the latter case the heat attendant to the extrusion operation may be sufficient for the bonding operation so that no added heat is necessary.

19 Claims, 22 Drawing Figures

Inventor

ALFONS WILHELM THIEL

ATTORNEYS

Inventor
ALFONS WILHELM THIEL
ATTORNEYS

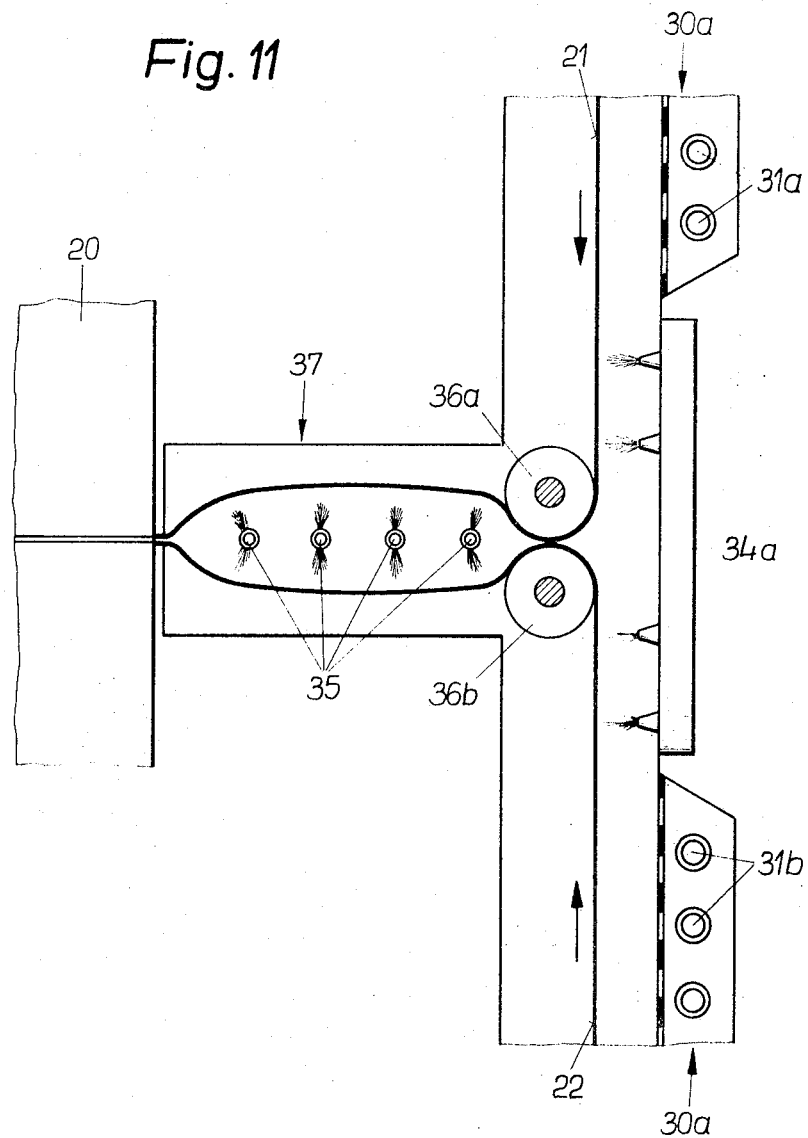

Fig. 16
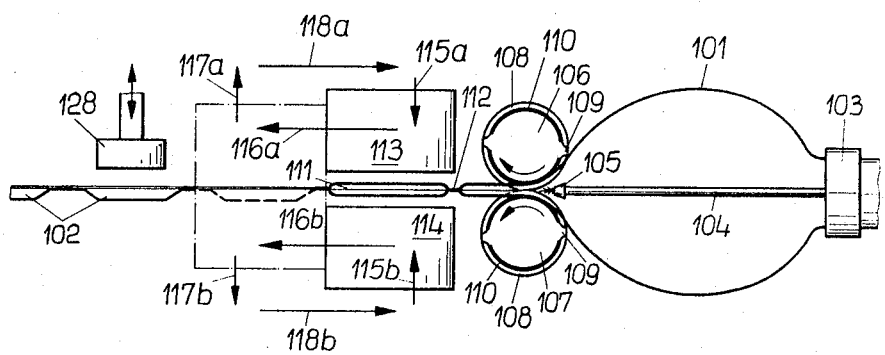
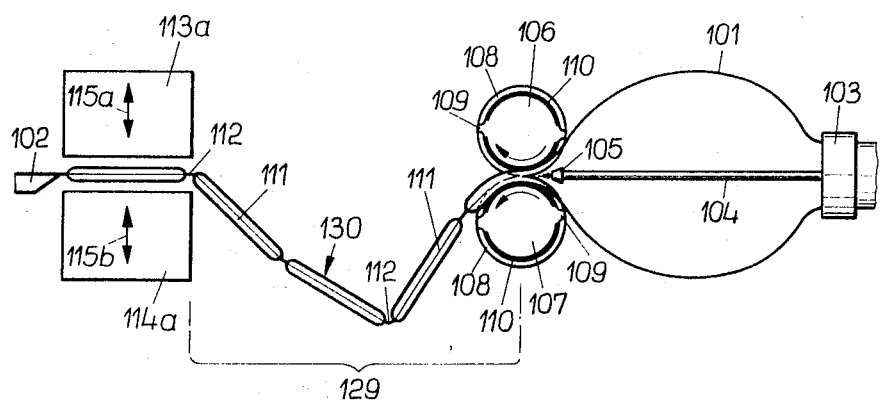
Fig. 17

Inventor
ALFONS WILHELM THIEL
ATTORNEYS 3,660,198

METHOD OF MAKING DOUBLE WALLED PLASTIC ARTICLES

This invention relates to double walled plastic articles, such as plates, cups, bowls and other receptacles, and flat pieces, where a thin walled lining shaped by thermoforming is incorporated, with formation of air spacing at least around parts of the peripheral wall, with a thin walled jacket also shaped by thermoforming, and is connected firmly with the latter at least at the outer peripheral edge. The invention include methods and apparatus for the production of such double walled plastic articles.

Cup-shaped double walled plastic vessels and like receptacles are known where a thin walled lining, shaped by thermoforming, is inserted into a thin walled jacket also shaped by thermoforming and is attached by being rolled at the upper outer edge with the jacket, forming an edge of a lip, while the lining is attached within the lower inside area of the jacket (German Utility Pat. No. 1,895,034). Between the two points of attachment an air space is provided that is protected against compression by axial or peripheral ribs in the lining or jacket, or both, to form heat insulation so that the vessel filled with a hot content can be handled safely. In making these known double walled plastic vessels, the lining and the jacket must be formed separately and then must be united with one another in a further operation and, finally, they must be connected with one another firmly on the peripheral edge. The foregoing production method is relatively expensive. Beyond that, in the case of double walled plastic vessels, both the lining and the jacket had to have relatively good dimensional stability, for which purpose both parts were formed relatively deeply to have relatively stable walls. This increased the costs of production.

A proposal has also been made to form double walled plastic articles, particularly double walled plastic cups, by first stamping a thermoplastic main foil with indentations at one side. Subsequently these indentations are then covered closed by a thin closing foil attached firmly as by welding on the stamped side of the main foil. From this connected foil assembly the desired plastic articles is then shaped by thermoforming (Belgian Pat. No. 597,838). This method of production for double walled plastic articles is also relatively expensive and can be carried out only with a relatively thick main foil capable of being stamped with the indentations.

This invention is based on the problem of creating double walled plastic articles, for example, plastic receptacles, vessels, or flat parts, such as coasters, saucers, etc., plates, cups and similar articles, which advantageously have low weight but nevertheless have high stability. The articles are produced simply and inexpensively. Despite their very slight wall thickness the articles of the invention offer good heat insulation in order that they may be handled comfortably and securely when filled with hot drinks, soups and the like or a very cold material such as sherbert.

According to the invention the problem is solved by firmly connecting the lining and jacket with one another within the area of an air space on relatively flat regions arranged at predetermined distances apart. This firm connection between the lining and the jacket offers the advantage that the lining and jacket stabilize each other and make possible the production of double walled articles of about half the weight but about the same stability as known comparable plastic articles. The invention also offers the particular advantage that the lining and jacket can be combined from different thermoplastic sheets or foils, for example from sheets or foils of different colors, varying strengths, varying quality or different material. The plastic articles according to the invention can be produced simply. They have particularly low weight, and both material and production costs are low.

It is particularly advantageous within the framework of the invention where the lining and the jacket are welded together at points of connection arranged within the area of the air space. An additional improvement and reinforcement of the connecting places may be achieved if at least a part of the welding places, or connecting spots, are arranged in semi-stamped, cut regions of both walls, or regions which have been pressed together in another way out of the plane of their surrounding foil material. It is also contemplated within the framework of the invention to coat at least one of the two foils providing the lining and jacket with a hot adhesive on the surface facing the other foil.

It is particularly advantageous within the framework of the invention if the lining and the jacket are formed respectively with crossing ribs within the area of the air space and are firmly connected as by bonding and welding with one another at the places where the ribs cross. It is also possible to form the lining and the jacket in annular displaced steps, which rest one on top of the other in narrow annular edge strips, and to subdivide the air space into annular areas, whereby the lining and the jacket are firmly connected one with the other at these annular edge strips. In both cases the lining and the jacket will form a structure of particularly great stability and which is similar to corrugated cardboard.

For the production of the plastic articles according to the invention, a novel method is particularly suitable, wherein two foils made of sheet thermoplastic material are initially united firmly into a double layer while forming air cushion means enclosed between them.

Each air cushion is of a size to correspond at least to the forming surface area of a mold in which a portion of the connected double layer in the area of an air cushion is simultaneously formed into the desired shapes of the lining and the jacket while controllably displacing air from the air cushion. The layers are brought together eventually while leaving desired air spaces between them and bonded directly through the action of pressure and temperature at desired regions for making a firm connection therebetween. Air may be gradually discharged form the cushion as by providing small openings in or piercing the air cushions, as the layers approach contact.

The process according to the invention offers special advantages. The two connected foils are shaped simultaneously to the finished article in one work operation wherein they are further connected firmly with one another. In the process according to the invention, very thin thermoplastic foils can be processed, for example foils of a thickness of 0.15 mm to 0.20 mm. Two such thin foils bonded together in the invention do not result in one-half the thickness of the foil of about 0.8 mm hitherto considered necessary or customary in forming such products. The processing of such thin foil makes possible quick heating and cooling times and thus enables a much higher production rate than hitherto. As compared to the hitherto customary thermoshaping processes, the process according to the invention is essentially simplified and as a result it has also been made considerably less expensive. Beyond that, it is possible as a result of the invention to produce the lining and the jacket from differing thermoplastic foils, such as foils of different color, thickness, quality or material.

In the invention, the surface of each air cushion can be formed in size and shape to correspond to the molded article to be produced, in such manner that the peripheral edge of the molded article either lies in or adjacent the connected area of the double layer surrounding the air cushion in the manner of a frame. It is also possible in the invention to form the surface of each air cushion in size and/or shape beyond the size and/or the shape of the molded article that is to be produced by a predetermined amount, and to displace air during the shaping method into the connected frame area of the double layer surrounding the air cushion and disposed between the peripheral edge of the molded article. This aspect of the process according to the invention offers the advantage that no special openings for the escape of the air from the cushion are needed or need be made, and the border areas of the air cushion lying outside the molded article will receive the displaced air possibly with a corresponding expansion of the foils. When cutting out these molded articles from the double foil layer, the excess air displaced into these border areas will then be released.

This method of operation of the invention offers the advantage that no preformed foils have to be stored and transported as intermediate products.

In one particularly advantageous practice of the invention, first a tubing of thermoplastic material is extruded, expanded and then compressed while hot to a frame-like pattern with air cushions between surrounding double layer connected portions of the tubing wall, and then the connected double layer prepared in such a manner and still hot is shaped in the areas of the air cushions into the double walled molded articles. The wall of the tube during extrusion and blowing up for expansion is at the extrusion forming temperature, so that the succeeding compression and unification of the tubing wall into a double layer with an air cushion enclosed may be possible in practice without additional heating up of the hose. The method is particularly capable of continuous production starting with raw materials.

Heat for the unification of the tube wall to a double layer and the subsequent thermoforming operation can be provided without difficulty because of the hot scavenging air usually required for extruding and blowing up the tubing with the necessary accuracy of temperature control on the tube or the double layer.

Thus the invention may proceed using only the residual heat from the extrusion process for the bonding, supplemental bonding heat may be provided as during the tubing expansion, or all of the bonding heat may be applied to the foils just before entering the forming dies.

It is particularly efficient for the process according to the invention to semi-stamp the foils together for mechanical interlock in spots at their connecting regions to improve the bonded connections, particularly if the strength of connection achieved by merely welding the foils together would not suffice. Another improvement of the strength of connection, especially with different type foils, consists in coating one of the foils, preferably prior to heating, with a hot adhesive on the side facing the other foil. In all cases it may be advisable to heat the two foils starting from the time their sides are facing each other until they can be shaped. As a result the foils will be prepared as by softening on the sides facing each other for the welding and bonding together which takes place in the deforming station immediately after shaping. The foil sides contacting the tool surfaces remain relatively cool and firm so that the foils can be securely and smoothly processed.

In the method of the invention, the lining and the jacket can be formed at the same time from the two connected foils while being welded together at their peripheries and leaving in the connected double layer at the periphery connecting bridges containing the air openings.

For carrying out the invention the apparatus includes a shaping tool containing two forming dies acting one toward the other. In this apparatus an arrangement for initially connecting the two foils into a double layer is provided in addition to the shaping tool, which arrangement comprises frame-like peripheral members that compress the two foils together while forming internal air cushions surrounded by the double layer compressed and connected regions. These members are adapted to the peripheral shape and size of the shaping tool, whereby to enclose the two forming dies which have usually differently shaped surfaces, one with the jacket rib shape and the other with the lining rib shape. The dies also carry in their shaped surfaces formations for the firm spot compressions of lining and jacket at the end of the shaping process.

The apparatus of the invention is particularly simple in structure and needs no added vacuum or compressed air for the die shaping process. The invention makes possible, furthermore, simplified control of the machine and low costs for its operation.

The arrangement unifying the foils to the peripheral size of the shaping tool may be such that the parts of the foil which have been sealed or welded together in double layer in the form of a frame around the air cushions and have already been compressed by the molding tool lie with border area of the molded article that is to be produced. But it is also possible to connect the two foils into a double layer so related to the peripheral size of the molding tool that, as explained above, the air cushion will protrude beyond the periphery of the molding tool.

In a particularly advantageous design of apparatus according to the invention, the arrangement connecting the two foils into a double layer in a frame pattern is separated in the direction of travel of the foils at the shaping tool.

The operating rhythm of the entire apparatus can be determined by the shaping tool. This will be possible and also advantageous whenever two separate foils are fed in, especially when these two foils are heated in a heating station forwardly of the device that connects them into a double layer. In such cases the two foils preferably will be guided step by step through a heating station, through the device connecting them into a double layer and then through the forming station containing the shaping tool.

On the other hand, however, it is also possible to develop the entire installation for continuous movement of foils connected into a double layer. For this purpose the device for connecting the two foils into a double layer can be developed for the continuous passage of the foil and moving the shaping tool over a path along with the connected pair of foils.

Finally, it is also possible to develop the entire installation to the point that it will continuously receive the arriving foils and change over to a step-by-step movement forwardly of the shaping tool.

For this purpose the device for connecting the two foils to a double layer can be developed for the continuous passage of the foils, while the shaping device is arranged longitudinally stationary and at a sufficient distance to permit the forming of free loops in the connected double layer foil for transition to step-by-step transportation.

The two latter possibilities for the foil transportation through the device are particularly suitable in connection with a preferred design of the installation according to the invention where the device connecting the two foils into a double layer is arranged forwardly of the annular nozzle of a continuous tube extruder and the wall of the tube blown up by hot scavenging air from the extruder.

In an advantageous embodiment of the invention, the device for connecting the two foils into a double layer is a frame surrounding the shaping tool, for compressing and welding the two foils together at that frame. This device at least in one of its annular cooperating compressing surfaces, has essentially radial notches to provide the above-mentioned connecting bridges. It will be particularly effective if it contains heating stations for the heating of both the foil surfaces that face each other during shaping. For example, a bilaterally acting heating arrangement can be arranged between guide installations for the two foils. It is also possible to provide two separate heating installations for the foils and an adhesive applying installation for at least one foil. In the latter case, there are better possibilities of heating up foils of various kinds and thicknesses with correspondingly different heating performances.

If coating of at least one foil with a hot adhesive is desired, such an installation may be disposed adjacent the heating station so as to coat with adhesive prior to heating. But it is also possible to arrange such an installation for the coating of at least one of the foils with hot adhesive between the heating station and the shaping tool.

It will be effective for the manufacture of plastic articles with a ribbed wall to develop the form dies with ribs running transversely in relation to one another, which ribs are harmonized in height in such a manner that in the case of a closed mold they will compress the two foils while welding them together at their points of crossing. For articles with a graduated wall, the form stamps can be developed with annular gradations which are displaced in such a manner in relation to one another that they overlap in narrow ribshaped areas, whereby these steps are harmonized in their height in such a manner, that in the case of a closed mold they press together the two foils in the overlapping strips while welding them. Additionally, the ribs or steps can be developed with arrangements for half punching of the two foils for mechanical interlock at their points of crossing or strips of overlapping.

It will be particularly effective if the peripheral frame on the outside edge of its cooperating annular front surfaces is formed with devices for punching out peripheral perforations in the two foils. The products cut out from the foils preperforated in such a manner, that is to say in the molding device and up to a few small separating bridges, can then simply be separated from the formed article in a succeeding work section.

Several embodiments of the invention are disclosed in the specification and the drawings wherein:

FIG. 11 is a schematic view showing apparatus for the production of plastic articles according to a further embodiment of the invention;

FIG. 16 is a schematic view showing of the process and basic construction of apparatus in a further embodiment of the invention;

FIG. 17 is a schematic view showing a variation of the process and basic structure of another apparatus similar to the shown in FIG. 16;

Figure 1:
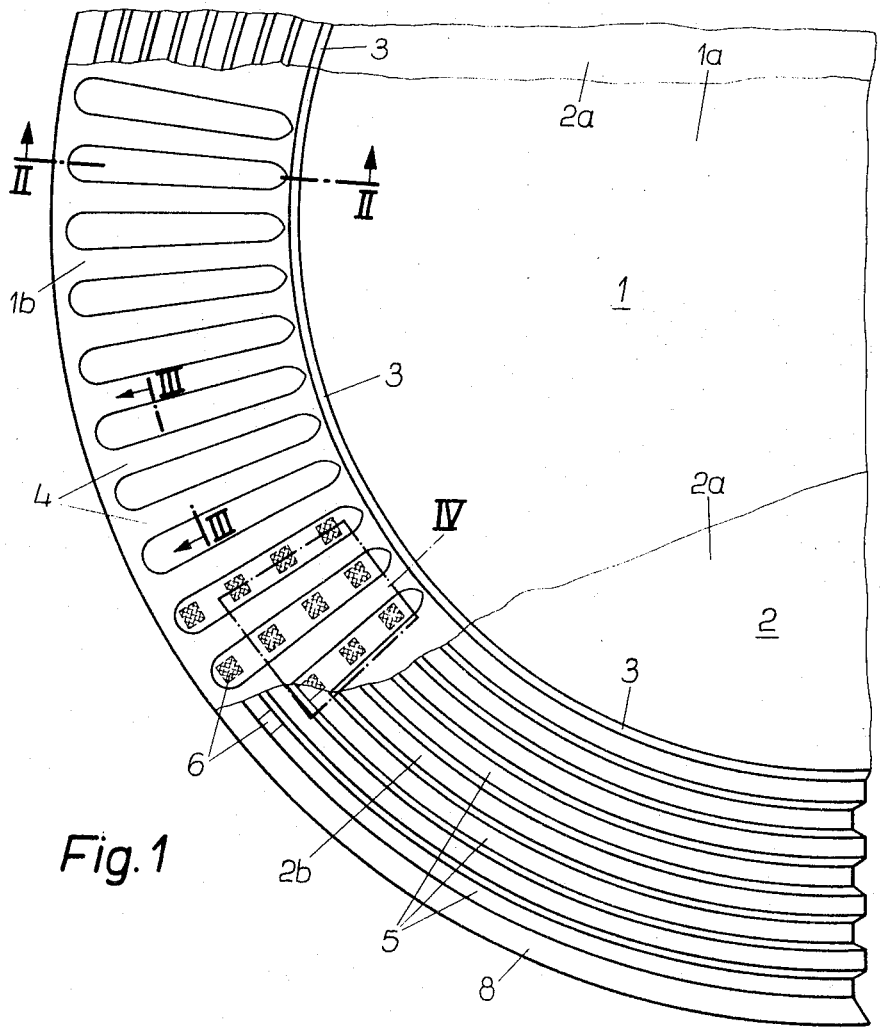
FIG. 1 is a fragmentary top plan view showing a plate according to an embodiment of the invention partially cut away to illustrate detail.
Figure 9:
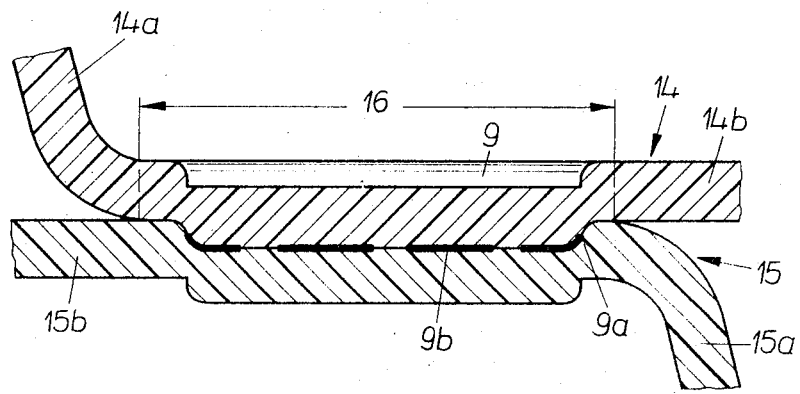
FIG. 9 is an enlarged section showing the region IX of FIG. 8 in a further embodiment.
Figure 12:
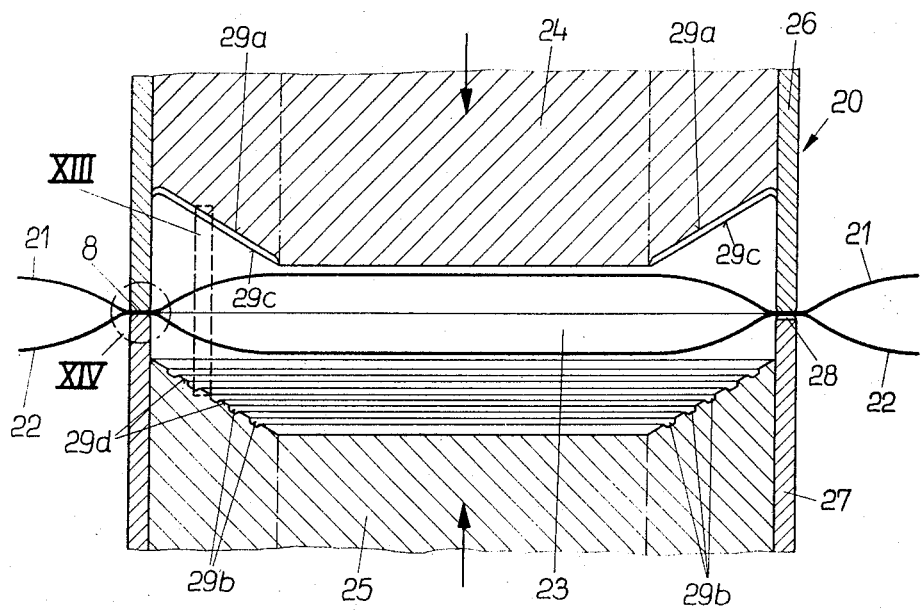
FIG. 12 is an axial section through a shaping or deformation tool of apparatus according to the apparatus of FIG. 10 or FIG. 11.

FIGS. 1 and 9 and 12 disclose an example of a double walled plastic plate made of thermoplastic sheet material. The invention can be used for other kinds of double walled plastic articles and receptacles produced by the thermomolding process, such as cups, saucers, bowls, packaging containers and other similar articles. The term receptacle will be used in the specification and claims as encompassing all of these products.

The illustrated plate has an internal lining wall 1 and an outer jacket wall 2. Lining 1 has a flat bottom wall section 1a and an upwardly and outwardly inclined side wall section 1b. Jacket 2 has a flat bottom wall section 2a and an upwardly and outwardly inclined side wall section 2b. Preferably the lining and the jacket bottom wall sections 1a and 2a are essentially flat, that is to say they are level or may have slight curvature convex upward. These bottom wall sections 1a and 2a are suitably firmly united to one another at their coextensive opposing surfaces. For example they are welded together by the application of heat and pressure to provide a full surface bonding.

Where the lining bottom wall section 1a and/or the jacket bottom wall section 2a are grained as disclosed in German Pat. No. 1,246,217; a large number of essentially pointlike connections represent contact between the lining and jacket and preferably these are welding areas between the lining bottom 1a and the jacket bottom 2a.

Figure 5:
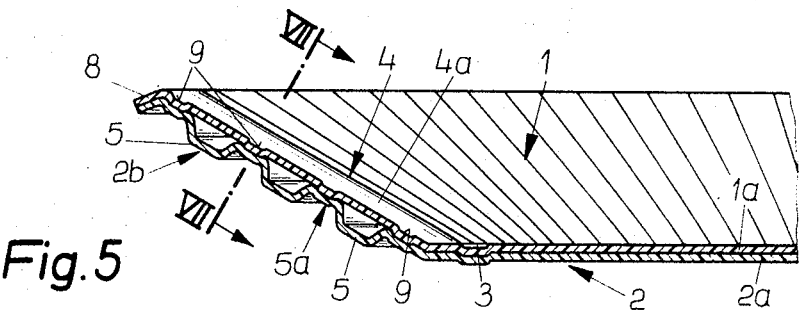
FIG. 5 is a partial view in section showing another embodiment of the invention.
Figure 6:
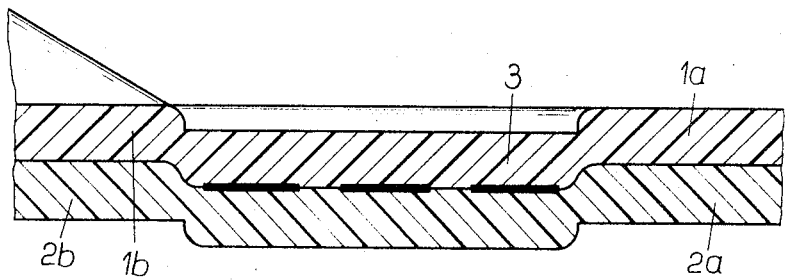
FIG. 6 is an enlarged fragmentary view in section showing detail of FIG. 5.

Referring to FIGS. 1, 5 and 6, the bottom wall sections 1a and 2a are surrounded by an annular attaching band 3. Band 3 is preferably formed by the lining 1 and jacket 2 jointly having been pressed down and half-stamped. A thorough welding connection between lining 1 and jacket 2 is provided through a hot stamping of the superposed foils respectively forming the lining and the jacket. This welded annular bond between the lining and jacket fuses together to join the foils integrally at both their coextensive engaged axial and inner and outer peripheral surfaces in the band region at 3. Thus at band 3 the jacket and lining are joined by a compressed integrally bonded annular region.

Figure 7:
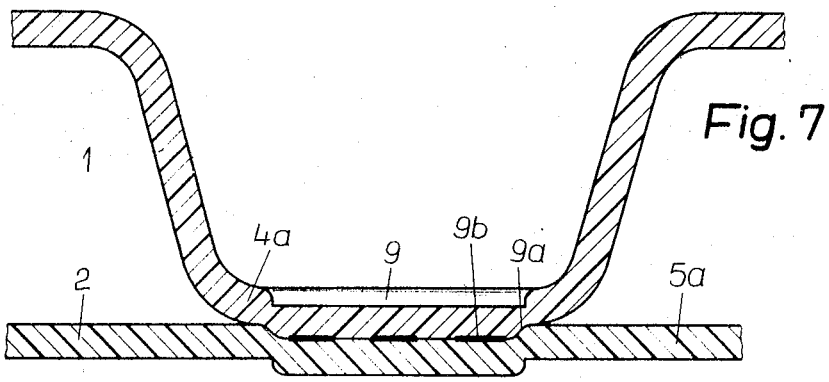
FIG. 7 is an enlarged section substantially on line VII—VII of FIG. 5.

In the relatively shallow receptacle of FIGS. 1 and 7, the peripheral wall 1b of lining 1 is formed with ribs 4 considered extending mainly generally radially, and in the case of more deeply drawn objects, such as packaging containers, dishes and the like their ribs are considered to extend mainly generally axially. In the claims these ribs will be defined as extending substantially radially and axially to include all of these embodiments.

Figure 2:
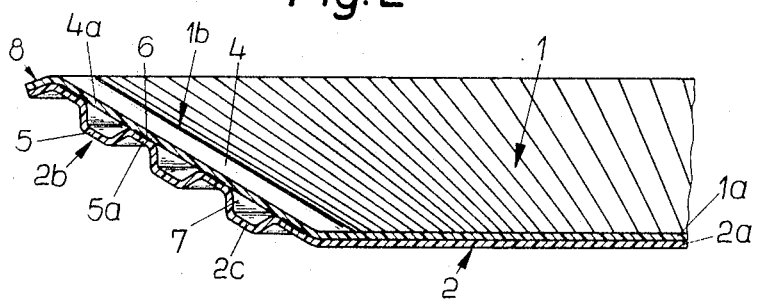
FIG. 2 is a fragmentary view in section substantially on line II—II of FIG. 1.
Figure 3:
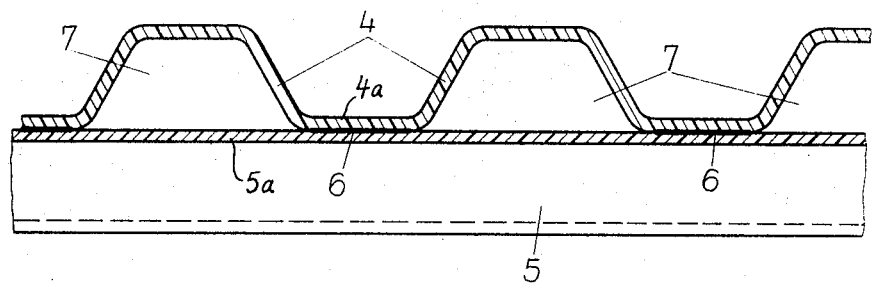
FIG. 3 is an enlarged partial section substantially on line III—III of FIG. 4.
Figure 4:
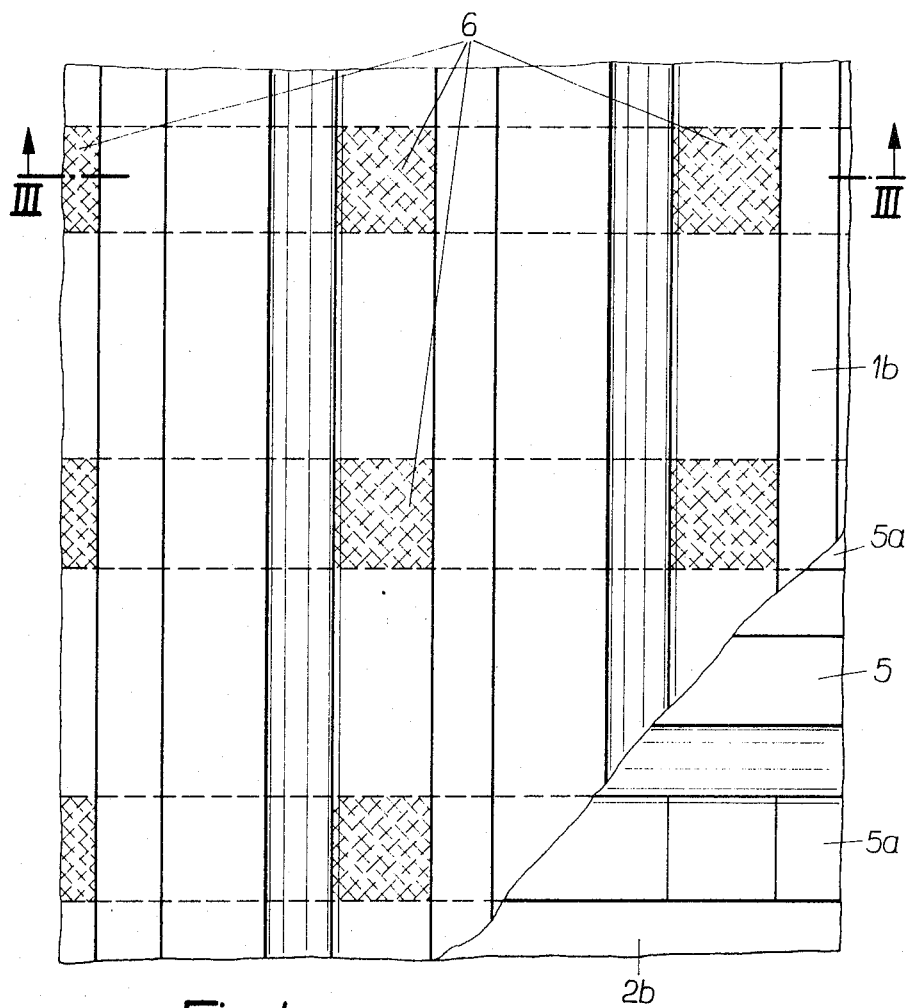
FIG. 4 is an enlargement of the region indicated at IV in FIG. 1.

Peripheral wall 2b of jacket 2 is formed with annular ribs 5 extending all around preferably concentric and parallel with the periphery. The ribs 4 and 5 provide a corrugated article side wall having air spaces 7 that are substantially trapezoidal in cross section as shown in FIG. 2 and 3. Ribs 4 and 5 preferably intersect or cross essentially at right angles. At the flat area points of crossing of the rib troughs 4a and 5a, the peripheral lining wall 1b and the peripheral jacket wall 2b are welded or fused together under heat and pressure. As FIG. 4 shows, these welding areas 6 are disposed in a regular pattern at predetermined distances from each other. As a result they give particular stability to the peripheral side wall 1b, 2b of the article. On the other hand, the welding areas 6 lie on the bottoms of the wave like ribs 4 and 5, so that within these wavelike ribs 4 and 5 the air spaces 7 thus provided guarantee good heat insulation.

At the outer periphery 8, as FIGS. 2 and 5 show, the outer edges of lining 1 and jacket 2 are welded or fused together all around into a unitary band 8 that is generally annular and continuous although openings may exist leading to air spaces 7 in some embodiment, as will appear.

Welded areas at 6 are normally sufficiently firm to suit practical requirements. It is contemplated to further improve attachment at these welded areas 6 by coating at least one of the foils from which linings 1 and jacket 2 are composed prior to processing with a hot adhesive on the surface facing the other foil. Another arrangement for reinforcement of the welded connection is shown in FIGS. 5 and 7. Here, half-punched or half-stamped regions 9 are formed at all welded areas 6. These half-punched regions 9 as FIG. 7 shows, are usually relatively circular spots wherein the wall of lining 1 and the wall of jacket 2 have been similarly pressed out and compressed together with similar fairly sharp edges. These half-stamped out regions 9 on their peripheral areas 9a and on their bottom areas 9b offer a particularly good high pressure connection between the wall of the lining 1 and the wall of jacket 2, so that there is formed a particularly secure and firm welded region. These additional connecting regions 9 are thus principally of the same type as the pressed band 3 shown in FIG. 6.

For some purposes the radially and axially extending ribs 4 in the side wall may be impractical for the lining 1. It is possible to also use an inverse arrangement, that is to say to provide the peripherally running annular ribs corresponding to ribs 5 in the lining 1 and provide the radially or axially extending ribs 4 in jacket 2.

Figure 8:
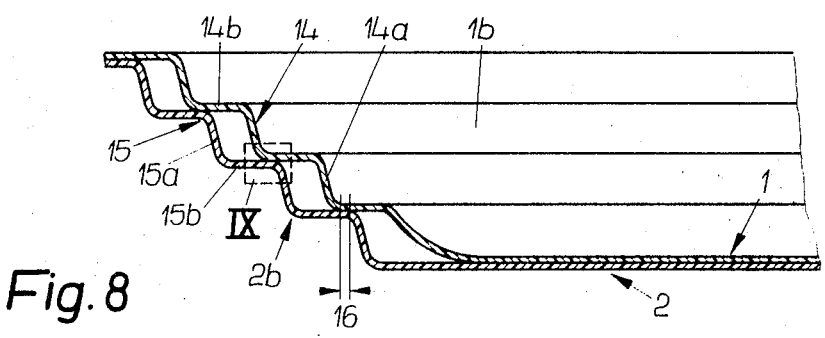
FIG. 8 is an enlarged partial section showing a plate according to a further embodiment of the invention.

A further structure is shown in FIGS. 8 and 9. There lining 1 on its peripheral wall 1b is formed with steps 14 having substantially axially extending annular wall elements 14a and substantially radially extending annular shoulder elements 14b. The peripheral wall 2b of jacket 2 also is formed in a corresponding manner with steps 15 having substantially axially extending annular peripheral wall elements 15a and substantially radially extending shoulder elements 15b. Lining shoulders 14b and jacket shoulders 15b overlap in relatively narrow annular strips or bands 16. At these strips 16, shoulders 14b and 15b are half-stamped and compressed together and welded under heat and pressure.

If desired, the bonded surface connection inside bands 16 can be still further improved if at least one of the two foils is coated with a hot adhesive prior to heating. In FIG. 9 the connection consists in forming compressed half-stamped regions 9 within bands 16. The basic structure of these half-punched spot regions 9 is preferably the same as in FIG. 7, so that as shown in FIG. 9 a more secure and more firm welding takes place at the peripheries 9a and the bottom areas 9b. As FIG. 9 also shows, the half-stamped region 9 can be developed so broad that it occupies practically the entire widths of the overlapping bands 16.

For the production of these plastic articles in an inexpensive, simple and rapid manner, the invention provides a process which may be explained in connection with FIGS. 10 to 15.

Figure 10:
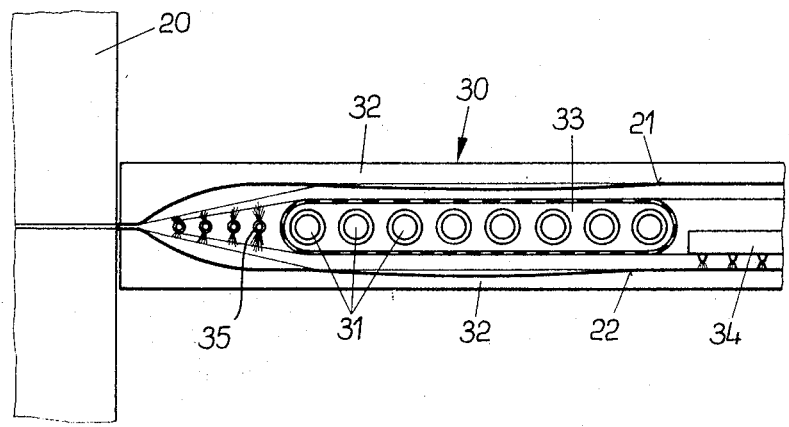
FIG. 10 is a schematic view showing apparatus for the production of plastic articles according to the invention.

In the process, the foils comprise continuous webs 21 and 22 of synthetic thermoplastic sheet material of suitable thickness. As shown in FIG. 10 the spaced webs advance together through a preheating heating station 30 into the shaping or deformation station 20. At station 30, the webs are simultaneously heated and softened at the sides facing each other, and adhesive is sprayed onto one of those facing sides. In FIG. 11 the adhesive is sprayed onto both facing sides of the respective moving webs and softening heat then applied before entering the deformation station. Die structure at a deformation station 20 is shown in detail in FIG. 12.

The foils 21 and 22 are first connected firmly to one another, preferably being welded under heat and pressure around a band or frame 8 corresponding to band 8 in FIG. 2 for example with the inclusion of an air cushion body 23 between them and leaving small peripheral air outlets in connecting bridges between foils 21 and 22. This may be accomplished as will appear by initial engagement of the dies 24 and 25 at the deformation station, or in a separate operation preceding entry of the webs to that station. The connected foils 21 and 22 between dies 24 and 25 are substantially simultaneously deformed to the desired respective shapes of the lining 1 and jacket 2, while at the same time providing and incorporating the desired air spaces 7 as the dies 24 and 25 move together. It will be noted that the upper die 24 is shaped to form generally axial and radial ribs in liner foil 21 and the lower die is shaped to form generally annular ribs in the jacket foil 22, as the dies come together. The reverse rib formations on the respective dies may alternatingly be provided. The air cushion 23 is mainly gradually displaced outwardly but during the forming it compresses somewhat and prevents the respective foils from receiving impression from the dies that do not contact them.

The foils are brought together and compressed firmly under heat and pressure at the desired connecting areas 6 between the ribs as the dies move together. The temperatures and the pressures prevailing during shaping and deformation are adjusted to suit the foil material being welded. It is also possible in the same deformation operation to provide sufficient die pressure to half punch the foils jointly and additionally at band 3 and at the connecting areas 6 and 9 according to FIGS. 6, 7 and 9.

As shown in FIGS. 10 and 11, coating the side of one of the foils facing the other foil with a hot adhesive, preferably prior to the heating or else between heating and insertion in the deformation station, may be accomplished by suitable spray devices.

Heating of the two foils 21 and 22, before they are formed, should be accomplished preferably with the heat directed at those sides of the foils which face each other so that these sides of the foils which are to be fused and bonded to one another will be heated and adequately softened.

During or immediately after the actual deformation or shaping operation the article can be peripherally punched or trimmed around its peripheral edge at 8 and separated from the foils while leaving connecting bridges in edge 8 located to accommodate the air outlets for cushion 23. The peripheral edge preperforated in this way makes it possible to expel air easily and under control from the connected double foil web.

FIGS. 10 to 15 also show preferred apparatus within the framework of the invention, and such contains a preferred shaping or deformation tool 20 within which the two foils 21 and 22 are connected and simultaneously deformed.

In FIGS. 10, the heating station 30 for the two advancing foils 22 and 21 is arranged at the entrance side of tool 20. Station 30 contains a longitudinal series of infra red radiator heaters 31 acting in opposite lateral directions. Above and below this series of heaters 31, guides 32 are disposed on which one foil 21 is conducted past above and the other foil 22 below the heaters in an even intermittent movement in relation to the deformation tool 20. For safety, the infra red radiators 31 are surrounded by a grid system 33 which does not impede heating, and any foils which might tear off and might flutter are protected from contact with the radiators. A spray arrangement 34 is provided located for example so that the lower foil 22 is sprayed with a hot adhesive on the side facing the foil 21 but before being heated. The spraying arrangement 23 could be arranged for spraying the upper foil 21 or for the simultaneous spraying of both foils 21 and 22, prior to their entering the heating station.

Foils 21 and 22 are preferably intermittently advanced from right to left in FIG. 10 at the same speed, and the dwell periods constitute the time needed to accomplish preheating and deformation.

Between the series of infra red radiators 31 and the deformation tool 20, the two foils 21 and 22 are directed toward each other together toward the exit mouth of guide 32. In the region shown in FIG. 10 to the right of that guide arrangement mouth, a fixed distance between the two foils 21 and 22 will essentially be maintained through the fact that there hot air is blown between and toward both foils as by nozzles 35. In this manner it is insured that the air cushion for the deformation exists with certainty between the foil 21 and 22 when the foils are introduced into deformation station 20.

In FIG. 11, eating station 30a is different in order to be able to permit suitable operating conditions whenever the two foils 21 and 22 differ essentially, apart from their processing conditions, for example, when they consist of different materials. Should the lower foil 22 require a high processing temperature and higher heat for softening than the upper foil 21, separate infra red heating arrangements 31a and 31b acting separately on a surface of each foil are provided, whereby one heating arrangement may be at a higher temperature than the other.

After leaving the heating installation the foils 21 and 22 reach the spraying device 34a which carries nozzles for the simultaneous spraying the facing sides of both foils with a hot adhesive. This spraying arrangement 34a during the run of the foils 21 and 22 may be turned on and off during the advance and dwell times respectively of foils 21 and 22.

After leaving the spraying arrangement 34a, the foils 21 and 22 run through a pass defined by deflecting rollers 36a and 36b so that they are close to each other with their preheated and adhesive bearing surfaces adjacent. Between deflecting rollers 36a, 36b and shaping tool 20, a blowing-up or inflation station 37 is provided containing hot air nozzles 35 disposed between the foils. This blowing up station 37 assures that the two foils 21 and 22 upon introduction into the shaping station will include between themselves the air cushion 23 of FIG. 12 which is necessary for the shaping or deforming step according to the invention. The combined lengths of the blowing up station 37 and of the effective part the spraying device 34a may correspond to the length the foils are moved between dwell periods in one operating step, and therefore to the length of the shaping station 20.

As shown in FIG. 12, shaping tool 20 contains aligned peripheral enveloping usually cylindrical frame members 26 and 27 inside of which the two forming dies 24 and 25 acting against each other are slidably guided. The upper frame member 26 and the lower frame member 27 may be moved axially in relation to one another and they can be relatively pushed together to engage and press the two foils 21 and 22 enclosed tightly together in a compressed band 8 around the air cushion 23 and as a result this essentially closes the air cushion 23 at all sides. This closed position of shaping tool 20 is shown in FIG. 12.

In one or both peripheral members, preferably lower member 27, essentially radial notches 28 are provided. Under the pressure exerted by the opposed aligned edge surfaces of members 26 and 27 as the two heat softened foils 21 and 22 are firmly pressed together substantially all around band 8 and they will weld together firmly and securely. The parts of the deformation station all may be heated and maintained at an adequately high temperature by suitable heater means (not shown). In the area of notches 28, however, the lack of compression insures that this firm connection between the foils 21 and 22 does not ensue and this provides non-connected foil bridge regions that serve as air outlets for cushion 23. Thus effective openings for exit of the air from cushion 23 are formed between the otherwise unitary bonded foils 21 and 22 the size of which openings will be determined by the size of the notches 28.

Upon now bringing the two shaping dies 24 and 25 together, which is preferably timed to take place after peripheral members 26 and 27 have bonded the effective article edges, the air cushion 23 will be initially compressed. Air escaping through the air outlet openings corresponding to notches 28 is slow in comparison with the relatively rapid compression of the air cushion, so that a considerable increase in pressure occurs within the air cushion 23, and this is suited for pressing or squeezing the foil 21 into the generally axial and radial recesses 29a of the forming die 24, which are provided for the developement of liner ribs 4. In the same manner, foil 22 is pressed or squeezed into the annular recesses 29b provided for the forming of annular jacket ribs 5 under the action of the increased pressure in the air cushion 23. Thus each foil is accurately first formed to its final ribbed shape of the article assembly prior to their being brought together at rib cross areas 6 and at bottoms 1a, 2a within the deformation station.

Upom completely bringing together the two forming dies 24 and 25, foils 21 and 22 will be pressed together firmly at the sides facing each other within the area of the associated molding parts, primarily being engaged on the bottom of the article that is to be produced and at the areas where the ribs cross. Since the two foils 21 and 22 are still relatively hot and softened at the surfaces facing each other, the two foils are welded together under pressure at the engaged areas.

Figure 13:
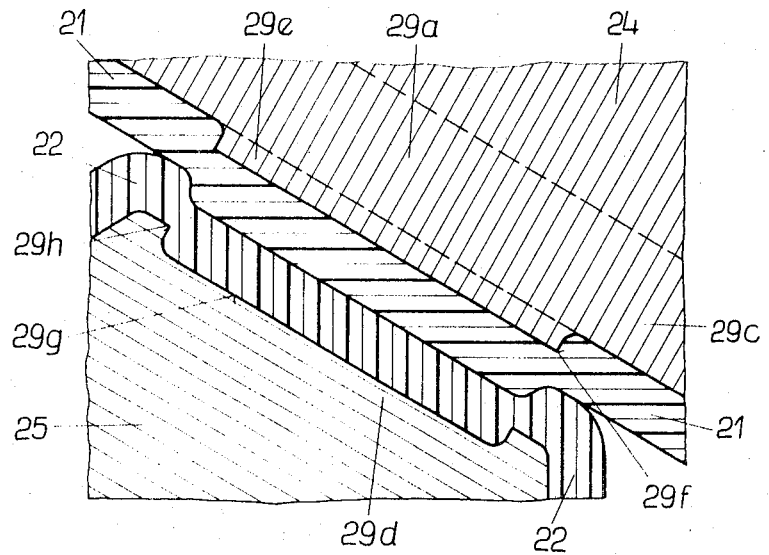
FIG. 13 is an enlarged view showing the region indicated at XIII in FIG. 12 when the tool is closed.

FIG. 13 shows a supplemental arrangement on the projecting parts of the forming dies 24 and 25. Here forming die 24 has additional half-stamping projections 29e at the ridges of its rib-like parts 29c. These projections 29e are in corresponding location to rib crossing areas 6 (FIG. 1) and to cooperate with corresponding recesses 29g on the ridges of projecting ribs 29d of the forming die 25. These additional projections 29e and recesses 29g may be of circular cross section with relatively sharp peripheral edges 29f on projections 29e and corresponding sharp peripheral edges 29h on the recesses 29g. As shown in FIG. 13, foils 21 and 22 are squeezed out of their planes in the areas of these semi-stamp formations 29e and 29h and are partially squeezed tightly between the opposed sharp peripheral edges 29f and 29h. In this manner a particularly effective welded connection between two foils 21 and 22 develops in the area of the half-stamp arrangements 29e and 29 h to provide the structure shown in FIG. 7.

FIGS. 12 and 13 thus show the development of the molding or foil deforming surfaces of the dies 24 and 25 for the production of the plates and like receptacles according to FIG. 1 or FIG. 5. For the production of receptacles according to FIGS. 8 and 9, the forming arrangement at the station 20 will have the same structure as to the peripheral frames 26, 27 and the forming dies 24, 25, with the difference that the die recessed regions 29a and 29b and the ribs 29c and 29d between them should be adapted to the stepped shape of the lining 1 and jacket 2 of the receptacle. Semi-stamp devices of the kind described above are to be included if desired in the same sense to the overlapping areas at 16 of the rib-like steps, to produce the structure shown in FIG. 9.

Where the work process as indicated in FIGS. 1 and 5 is to be developed with a half-stamped band 3 surrounding the bottom wall sections, the molding surfaces of the dies 24 and 25 respectively include a corresponding annular projecting rib and an associated recess for providing the structure shown in FIG. 6. This rib and the recess are preferably circular.

Since, in the case of the tool shown in FIG. 12, the peripheral members 26 and 27 effectively screen the actual deformation process toward the outside and since, above all, the peripheral frame defined by members 26 and 27 and the shaping dies 24 and 25 can be kept at a relatively low temperature, the formed plastic receptacle may be punched out of the foils outside the peripheral frame immediately during the deformation operation or it may be sufficiently perforated that it can be punched out and detached easily from the foils during succeeding operation.

Figure 14:
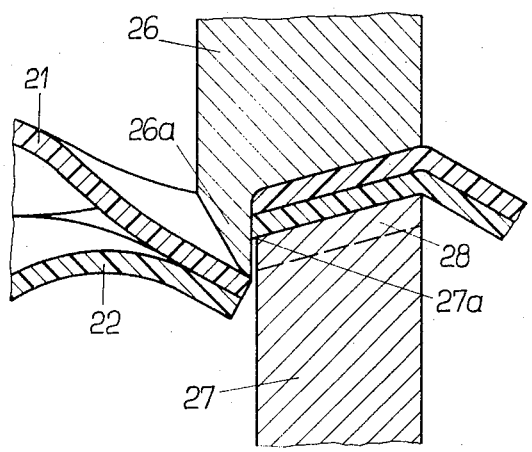
FIG. 14 is an enlarged section showing the region XIV in FIG. 12 according to an embodiment.

FIG. 14 shows a device for perforating foils 21 and 22 at the outer peripheral edge of the article being shaped at station 20 which device is attached to the peripheral frame 27,26. This arrangement consists of a shear having a substantially annular knife edge lip 26a projecting downwards from attachment to the upper frame member 26 and a substantially annular knife edge 27a attached to the upper outside peripheral edge of lower member 27. The lip 26a of the knife and the edge 27a of the knife are discontinuous in the area or areas of the notches 28. When the die parts are closing, foils 21 and 22 therefore will be perforated around the entire edge of the knife, while connecting narrow bridges remain between the shaped article and the foils 21 and 22 in the areas of notches 28 and the air outlet openings between the foils 21 and 22. This prevents the knife from closing the air outlets. The bridges however can also be readily severed after opening of the mold by simple expulsion of the formed article from the foil webs 21 and 22. In FIG. 14, the foils are clamped tightly for fusion together between the notched parallel surfaces of members 26 and 27 radially inwardly of the knife edges.

Figure 15:
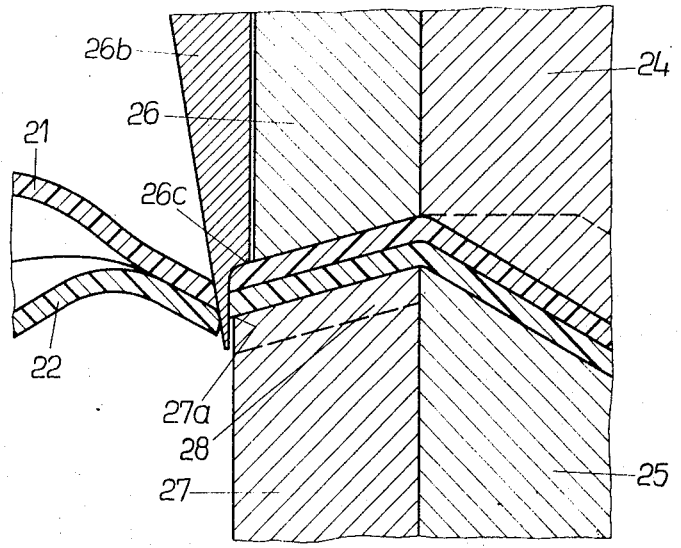
FIG. 15 is an enlarged section showing the region XIV of FIG. 12 in a still further embodiment.

FIG. 15 shown another form of article punching out device. An annular punching knife 27b is reciprocably guided on the outside of the upper member 26, while the lower member 27 again has been formed with a cutting edge 27a. In FIG. 15, the upper member 26 is formed with a smaller outside diameter than lower member 27 and annular knife 26b is provided with a lower shoulder 26c. The axial length of annular knife lip 27a is such that in its illustrated cutting stroke end position it will project beyond the notches 28 disposed in the lower member 27. The annular knife 26b in this example is pushed downward only after completely bringing together and compressing the foils between the edges of the shaping dies 24 and 25, so that the knife will cut the shaped article entirely around its edge from the connected foils 21 and 22. When knife shoulder 26c engages the outermost peripheral edge of the article, it more strongly presses on the foil edges. In this embodiment the air exit openings corresponding to the notches 28 will thus be closed during the subsequent punching out of the articles.

FIG. 16 represents a method of execution of a continuous process as well as apparatus according to the invention in which a plastic tube 101 is extruded and blown up and processed immediately afterwards into desired double walled plastic articles 102 that are then extracted from the tubing at the station 128.

Plastic tube 101 is continuously extruded from the ring nozzle 103 of a tube extruder and is blown up into a bubble with hot scavenging air adjacent the ring nozzle 103, in order to expand the wall of the hose on all sides to obtain the desired wall thickness of the article to be formed. The hot scavenging air from a source (not shown) is continuously introduced through pipe 104 which extends into the extreme left end of the formed bubble in FIG. 16 and there carries a blowing-in nozzle 105. The hot air softens the inner facing side surfaces of the tubing. At the end of the tube bubble 101 remote from nozzle 103, a pair of associated rollers 106, 107 are arranged to define a pass by which the tube 101 is compressed horizontally into substantially flat condition. Each of the rollers 106 and 107 carries on the opposite ends of its periphery annular shaping elements 108 and transverse shaping elements 109 extend between the annular elements. These elements 108, 109 project from the roller peripheries. The peripheral areas of the connecting rollers 106 and 107 disposed between the projecting elements 108 and 109 are covered with a heat insulating layer 110 such as felt. Rollers 106, 107 are driven synchronously and oppositely, as indicated by the arrows. At the same time the drive of rollers 106 and 107 is synchronized with the exit speed of the tubing from nozzle 103 to maintain continuous feed of the tubing through the rollers.

The wall of the expanded tubing is pressed into a double foil layer between rollers 106 and 107, which layers are firmly connected and surface bonded one another in the areas contacted by the elements 108 and 109, that is to say they are welded together or sealed together along the side edges and transversely as indicated at 112. Trapped or framed air cushions 111 are thus provided between the two layers of the tube wall as the tubing emerges from rollers 106 and 107. Within these air cushions 111, the two layers of foil constituting opposite walls of the tube will remain hot and deformable since they have come into contact only with the heat insulated coatings 110 of the rollers. Any desired thickness of air cushion 111 can be provided by selection of the height at which the shaping elements 108 and 109 project beyond the coated intermediate surfaces of the rollers. The foil parts bonded firmly with one another thus form a stable reinforced border surrounding the air cushions. The peripheral shape of the air cushions at the same time can be adapted to the subsequent peripheral shape of the article to be molded.

Figure 21:
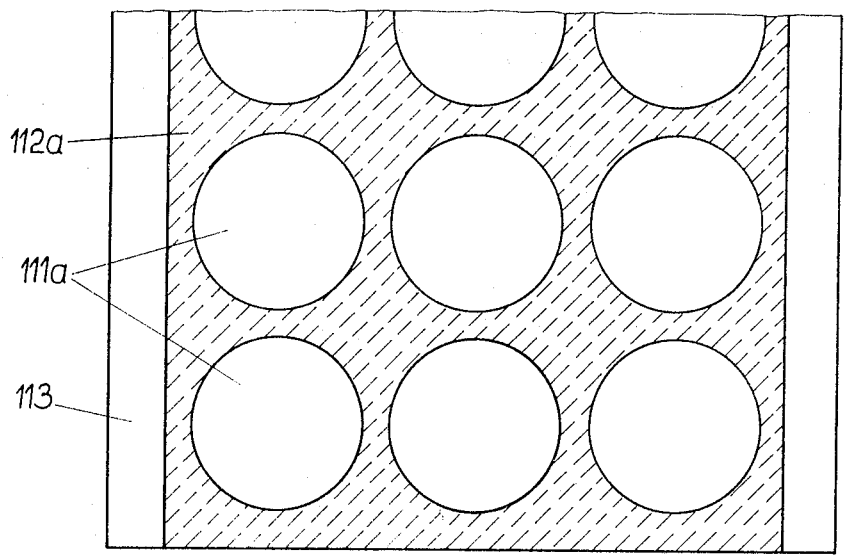
FIG. 21 is a top plan view showing a double foil layer according to the process of FIGS. 16–19.
Figure 22:
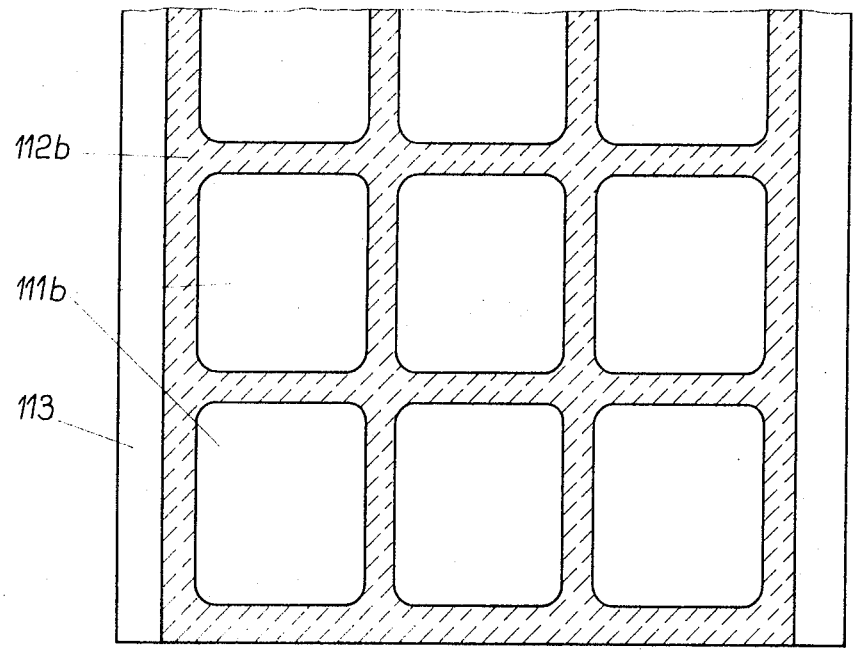
FIG. 22 is a top plan view showing a second form of a double layer of two foils made by the process of the invention.

FIG. 21 and 22 show examples for the peripheral shape of the air cushions. For example they may be circular air cushions 111a according to FIG. 21 whereby circular plates, saucers, and bowls may be made. These circular air cushions 111a are surrounded by a stable connected double layer border 112a wherein the double foil layer is stabilized and connected prior to the actual thermoshaping process to such a extent that it can be guided safely through the shaping operating. On the outer walls, strip-like areas 113 are preferably left where the wall of the tube has been folded back. In these areas no welded connection has been made between the two layers in order to make possible a welded connection in the middle foil area which will be free of distortion. During the further shaping operation conveying devices for the connected double layer may engage the lateral strips 113.

In the example of FIG. 22 the air cushions 111b are formed approximately rectangular in order to adapt them more, for example, to the production of rectangular molded articles such as rectangular saucers, trays, cups and the like. In this example, the welded connected areas of the two layers forming the strengthened border structure 112b is formed in a smaller surface ratio relative to the air cushion 111b, but neverless it is still large enough that it will guarantee the safe transportation of the connected double layer through the subsequent deformation operation. In the example of FIG. 22, the process started from an extruded plastic tube as in FIG. 16 and therefore a non-connected strip 113 preferably remains on each extreme lateral edge of the double layer. In the examples of FIGS. 21 and 22, several air cushions 111a or 111b may be arranged laterally one beside the other across the flattened tubing. The double layers of foils shown in sections in FIG. 21 and 22 should therefore preferably be processed in multiple thermomolding deformation tools.

The safe and even filling of all air cushions 111 will be guaranteed, as FIG. 16 shows, by the fact that nozzle 105 for the hot scavenging air is advantageously located at the extreme end of the hose bubble 101 remote from nozzle 103 so that it directs the hot jet of scavenging air toward and into the restricted region and between rollers 106 and 107. As a result, the walls of the tube corresponding to the air cushions are tightly pressed against the insulation covered surfaces of the rollers 106 and 107 and the space between the layers of foil is filled with hot air and sealed off as roller projections 108 and 109 come together to compress the tube between them.

After leaving connecting rollers 108 and 109, the connected double layer of foil containing the air cushions 111 and stabilized by the frame-like border 112 around the cushions arrives at the shaping or deforming station tools 113, 114. In the example of FIG. 16, these shaping tools 113 and 114 are developed as four motion traveling tools which are suitably moved according to the arrows 115a, 115b, 116a, 116b, 117a, 117b and 118a, 118b. This four motion mode of movement illustrated schematically may be accomplished as disclosed in U.S. Pat. No. 2,230,189.

Figure 19:
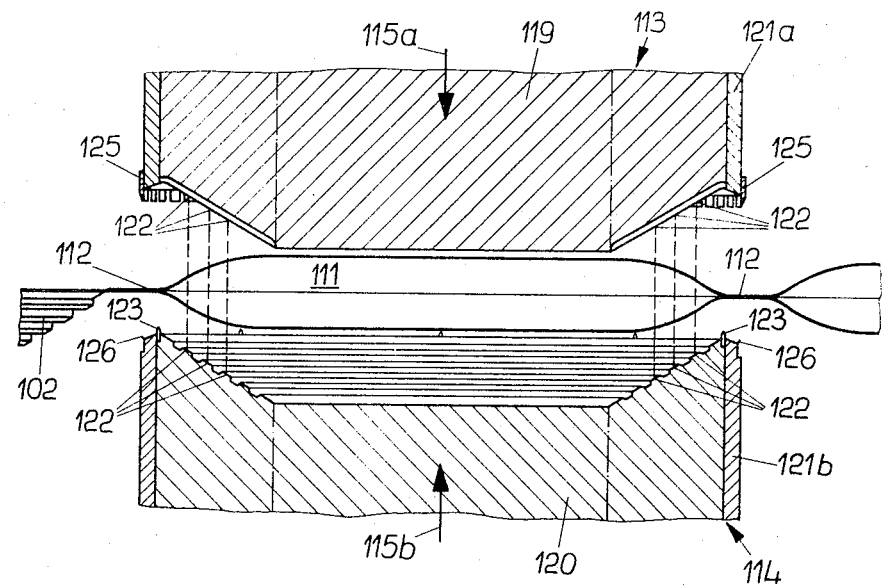
FIG. 19 is a section showing a shaping tool in its open state, such tool being used in the apparatus of FIG. 5, and 16–19.
Figure 20:
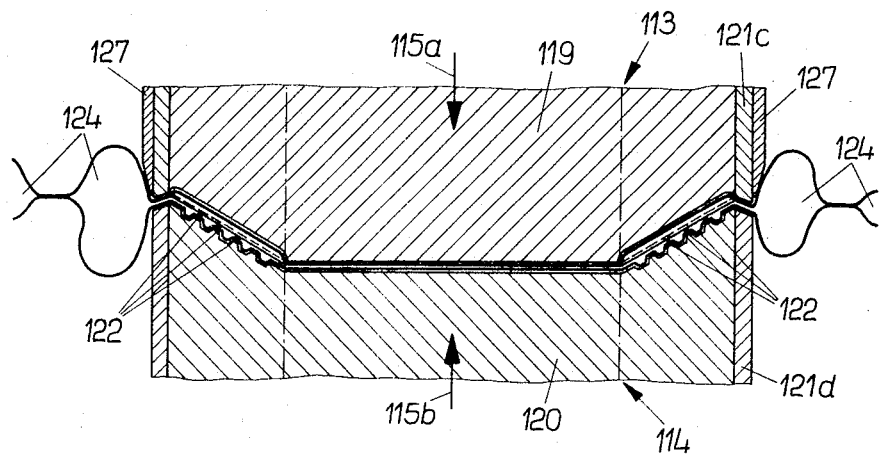
FIG. 20 is a section showing a further embodiment shaping tool in almost closed condition.

The shaping tools acting against each other when moving according to arrows 115a and 115b contain, as shown in FIGS. 19 and 20, shaping dies 119 and 120 moved toward each other. These dies are surrounded by peripheral frame members 121a, 121b or 121c, 121d for forming the peripheral edges of the molded article. These frames 121a to 121d however can also be provided directly on the shaping dies 119 or 120.

As disclosed in FIGS. 19 and 20, shaping dies 119 and 120 have areas 122 on their shaping surfaces, which upon completely bringing together the two shaping dies 119 and 120 approach each other so closely that they will deform and firmly press toward each other the layers of foil lying between them and seal them one with the other as disclosed for the embodiments above described. When bringing together the two shaping dies 119 and 120, according to the arrows in FIGS. 19 and 20, the air present in air cushions 111 will be displaced laterally. In the example of FIG. 19 the mutual harmonization of size of the cushions 111 and the shaping dies 119 and 120 and their frame members 121a and 121b is such that the frames 121a and 121b defining the peripheral edge of the article will engage and compress the tube at the edge area frame 112 around the air cushion 111. As a result the double layer of foil can to a large extent be utilized with a minimum of waste. In order to free air from the air cushion 111, toward the end of the shaping operation a row of small needle-like knives 123 disposed at intervals within frame member 121b prick small openings in the edges of air cushion 111 to gradually release the trapped air. The small pricked holes made during this action will not damage the finished product.

In the example of FIG. 20 arrangement for air displacement of a different kind in the air cushion 111 is provided. In this example, air cushion 111 is larger peripherally larger than the shaping tool and there is a free outer area or areas 124 of the air cushion into which air is displaced laterally as the cushion is compressed during the shaping operation, whereby the walls of the foils of these outer areas, as indicated in FIG. 20, may flex and expand considerably.

In the example of FIG. 19, perforating knives 125 in the manner of teeth are arranged at intervals on the lower peripheral edge of upper frame member 121a. These perforating knives act together with an annular cutting edge 126 on the upper outside edge of lower frame member 121b, so that the article can be perforated after the shaping process and later on be extracted easily. In the example of FIG. 20, a knife ring 127 is guided for sliding axially on the outside surface of upper member 121c. This knife ring, after complete compression of the foil between the two shaping dies 119 and 120, is pushed axially to sever the formed article from the connected foils.

After the shaping tools 113 and 114 in moving toward each other have advanced somewhat beyond the position shown in FIG. 20 to such a point that the two layers of foil are deformed and firmly bonded with one another as shown in FIG. 16, the pair of shaping tools 113, 114 will travel longitudinally according to arrows 116a and 116b with the formed foil between them for some distance, usually until the layers of foil being connected by the shaping dies 119 and 120 have adequately cooled down and solidified. The shaping tools 113 and 114 are then laterally separated from the formed foil according to arrows 117a and 117b, and for the next cycle are returned according to arrows 118a and 118b. As shown in FIG. 16, a separating device 128 is disposed beyond shaping station, which descends periodically for the purpose of extracting shaped articles from the connecting foil.

FIG. 17 shows a variation of the basic structure of FIG. 16 to the extent that in place of a four motion traveling pair of shaper tools a reciprocable two motion pair of shaping tools 113a, 114a is used, which are periodically closed toward each other and opened as shown by the double arrows 115a and 115b. This pair of shaping tools 113a and 114a can be connected to a continuously operating foil production devices, as for example to the tube extruder 103 in FIG. 16. The FIG. 16 arrangement for forming the wall of the tube 101 with spaced enclosed air cushions 111 can also be used, and reference is made in this respect to the detailed description of corresponding parts in FIG. 17 structure for forming the sequence of air cushion chambers 111.

The thermoshaping station formed by the tools 113a and 114a is arranged at such a distance 129 from the welding or seam forming rollers 106, 107 that the connected foil with the spaced enclosed air cushions 111 will sag downward in the form of a sufficiently large loop 130 that it will be possible to change over without trouble from continuous passage through the pair of foil connecting rollers 106, 107 to a suitable step-by-step conveyance through the thermoshaping station 113a, 114a. The loop will periodically reduce in size as the intermittent feed through tool 113a, 114a quickly draws a fresh bounded air cushion section of the foil into the tool, and enlarge during the dwell periods.

The internal molding structure of the shaping tools 113a and 114a may be the same as explained above in connection with the tools 113 and 114 of FIGS. 19 and 20.

Figure 18:
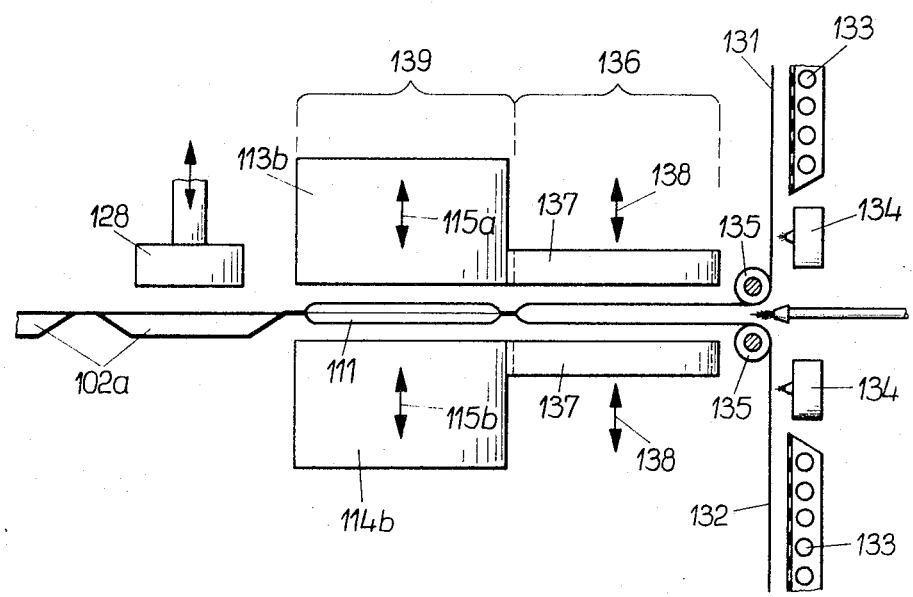
FIG. 18 is a schematic view illustrating a further embodiment of the basic process and apparatus.

If it is desired to produce molded articles 102a from a connection foil composed for example of two foils of differing type and quality, then the process according to the invention can also be carried out in the manner disclosed in FIG. 18. There a foil 131 of one type or quality is fed from above and a foil 132 of another type or quality is fed in from below. At the same time each of the foils is guided step by step past radiant heating devices 133, where they are heated to the point of plasticity at the side surfaces which later are to be joined. Hot adhesive spraying devices 134 follow the heating arrangements 133. The heated foils 131 and 132, usually but not necessarily in all cases sprayed with a hot adhesive, will be directed into approximately parallel relation by rollers 135 equipped with heat insulating surfaces and then introduced into a connecting station 135. In this connecting station 136 wherein frame-like connecting tools 137 act toward each other. As these tools move toward one another according to the double arrows 138 they compress foils 131 and 132 in frame-like borders such as shown in FIGS. 21 and 22, in order to sealingly connect them firmly at the borders surrounding air cushions 111.

The connected foil with air cushions created in the connecting station, is moved step by step into the deforming or thermoshaping station 139 which contains two shaping tools 113b and 114b acting toward one another according to double arrows 115a and 115b. The structure of these shaping tools 113b and 114b may be the same as explained above in connection with FIGS. 19 and 20, or FIG. 12. Normally the frame-like connecting tools 137 of the connecting station 136 are moved independently of the shaping tools 113b and 114b, but it is also possible to move both pairs of tools 113b, 137 (upper) and 114b, 137 (lower) in a synchronized manner, or to move them jointly, so that while the connecting station is forming the border area the shaping station will be at the same time forming the article and preparing it to be punched out at 128. The shaped article 102a formed in the thermoshaping station 139 is separated from the connecting foils surrounding it, as the example of FIG. 16, with a periodically acting device 128 or with a stamping arrangement.

The method of operation according to FIGS. 16 and 17 is usually quite favorable because the extruded tubing 101 is usually already quite hot with heat softened walls as it emerges from the nozzle 103 and this heat may be utilized as sufficient for the thermoshaping process. Thus, in some instances, no added heat at all or only very little will be needed for the foil bonding actions. Thus while expanding air may be introduced at nozzle 105 it need not be relied upon for heat to soften and render plastic the interior tube wall. Moreover, it is possible to provide an auxiliary tube heating arrangement in the apparatus according to the invention in any case, for the purpose of adding necessary supplemental heat to the connecting foils in difficult cases.

The aspect of the invention according to FIG. 18 offers the advantage, as compared to FIGS. 16 and 17, that foils of various types, quality and thermal characteristics can be processed into the desired receptacles.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of producing double walled plastic articles comprising uniting two opposed sheets of thermoplastic material into a double layer in a region surrounding non-united areas of said sheets, said non-united areas enclosing a cushioning body of air, such areas corresponding effectively to the size of the article to be produced, forming the sheets at opposite sides of the air cushion to predetermined shapes while displacing them toward each other and while providing passage for air to escape outwardly from said sheets adjacent an outer annular peripheral section of said sheets as said sheets move into engagement, said sheets at said sides being so relatively shaped as to engage at a plurality of spaced connecting areas around said outer annular peripheral section, and thermally bonding said connecting areas firmly together, said sheets being so spaced between said connecting areas as to provide insulating air space within said peripheral section.

2. The method defined in claim 1, wherein said sheets are substantially simultaneously shaped as they move toward each other.

3. The method defined in claim 1, wherein air is controllably exhausted from said body as said sides move toward each other whereby to maintain cushioning and promote shaping while permitting said movement.

4. The method defined in claim 3, wherein said air cushions are perforated to permit air exhaust.

5. The method defined in claim 3 wherein said air cushions are sized larger than the desired article size whereby cushioning air is displaced to the outer periphery during cushioning and is exhausted in a subsequent step.

6. The method defined in claim 1, wherein a spaced plurality of said cushioning bodies of air are formed in said connected sheet material for multiple article production.

7. The method defined in claim 1, wherein said sheets are heat softened at least at their facing surfaces around and within the air body whereby they are thermally surface bonded in said region surrounding the air body and at said connecting areas.

8. The method defined in claim 7, wherein said sheets are mechanically interlocked by compression at said connecting areas while they are being thermally bonded.

9. The method defined in claim 1, wherein at least one sheet is coated with hot adhesive on the surface facing the other sheet before shaping.

10. The method defined in claim 1, wherein said sheets comprise two separate foil webs that are advanced successively through a preheating station wherein their facing sides are heated and a shaping station wherein the foils are connected and shaped, and the formed articles are severed and separated from the connected foil webs.

11. The method defined in claim 10 wherein said foils are subjected to a hot air blast directed toward their facing sides prior to being united.

12. The method defined in claim 1, wherein said double layer region is formed continuously around said air cushion except for at least one non-united bridge containing an air outlet through which air escapes as the cushion is compressed during shaping.

13. The method defined in claim 12 wherein said double layer region is severed except at said bridge or bridges when said double layer region is united.

14. The method defined in claim 1 characterized in that the two sheets are bonded under heat and pressure with one another all around at the beginning of the shaping operation, first of all at the outer peripheral edge of the double walled article to be produced, with the inclusion of the air cushion and while leaving certain outlets for the air between the foils, and then they are shaped into a receptacle lining and receptacle jacket respectively immediately afterwards within the bonded peripheral edge and pressed together and bonded at the connecting areas.

15. The method defined in claim 1 characterized in that the surface of each air cushion is sized to extend laterally a predetermined amount beyond the area of the molded article to be produced and that the air within the cushion is displaced to the outer periphery of the cushion beyond the shaped portions to lie outside the bonded double layer region.

16. The method defined in claim 1 characterized in that the sheets are opposite sides of an extruded tube compressed to provide said double layer region in a frame-like pattern around spaced air cushions.

17. The method defined in claim 16, wherein said tubing is compressed for connection and shaped while retaining heat from the extrusion process so that no added heat is required.

18. A method for the continuous production of double walled plastic articles comprising the steps of continuously extruding tubing of thermoplastic material, expanding said tubing to a thinner wall size, compressing the expanded tubing to a substantially flat condition in which the compressed tubing has opposite sides and thermally bonding said opposite sides in a region surrounding unbonded areas of said opposite sides, said unbonded areas enclosing a cushioning body of air, forming the opposite sides of the air cushion to predetermined shapes while displacing them toward each other and while providing passage for air to escape outwardly from said sides adjacent an outer annular peripheral section of said sides as said sides move into engagement, said sides being so relatively shaped as to engage at a plurality of spaced connecting areas around said outer annular peripheral section, thermally bonding said connecting areas firmly together, said sides being so spaced between said connecting areas as to provide insulating air space within said peripheral section, and then separating the formed article from the remainder of the extruded tubing.

19. The method defined in claim 18 wherein said tubing is expanded by an internal blast of hot air.

* * * * *